(12) United States Patent
Clute et al.

(10) Patent No.: US 7,051,682 B2
(45) Date of Patent: May 30, 2006

(54) GUIDANCE DEVICE FOR A DOMESTIC ANIMAL

(76) Inventors: Irene Clute, 827 S. Cuyler, Oak Park, IL (US) 60304; Christine Gajda, 510 S. Harvey, Oak Park, IL (US) 60304

( * ) Notice: Subject to any disclaimer, the term of this patent is extended or adjusted under 35 U.S.C. 154(b) by 0 days.

(21) Appl. No.: 10/648,501

(22) Filed: Aug. 26, 2003

(65) Prior Publication Data

US 2005/0045116 A1    Mar. 3, 2005

(51) Int. Cl.
*A01K 27/00*    (2006.01)
(52) U.S. Cl. .................................................... 119/864
(58) Field of Classification Search ........ 119/862–864, 119/829, 855
See application file for complete search history.

(56) References Cited

U.S. PATENT DOCUMENTS

| | | | |
|---|---|---|---|
| D163,375 S | 5/1951 | Elsinger | |
| 2,743,702 A * | 5/1956 | Sullivan | 119/864 |
| 2,859,732 A * | 11/1958 | Driscoll | 119/864 |
| 3,159,140 A | 12/1964 | Miller | |
| 3,872,833 A * | 3/1975 | Herbert | 119/864 |
| 4,924,815 A * | 5/1990 | Halla | 119/864 |
| 4,964,369 A | 10/1990 | Sporn | |
| 4,996,948 A | 3/1991 | Klein | |
| 5,647,303 A | 7/1997 | Deioma | |
| 6,938,580 B1 * | 9/2005 | Herbst | 119/864 |

FOREIGN PATENT DOCUMENTS

WO    WO 00/67564    11/2000

* cited by examiner

*Primary Examiner*—Teri Pham Luu
*Assistant Examiner*—Kimberly S. Smith
(74) *Attorney, Agent, or Firm*—Michael R. McKenna

(57) ABSTRACT

A guidance device for a domestic animal that can be attached to a dog's neck without twisting comprising means for reversibly connecting which is independent of internal rotation about its longitudinal axis.

22 Claims, 3 Drawing Sheets

GUIDANCE DEVICE FOR A DOMESTIC ANIMAL

BACKGROUND OF THE INVENTION

This invention relates to a guidance device for a domestic animal, such as a dog, comprising a primary collar section, a secondary collar section, and means for reversibly connecting the secondary collar section to the primary collar section to form a training collar which can be easily placed around the dog's neck without the twisting inherent in prior art training collars.

The applicants have discovered that if you hold a training collar in front of you, as if preparing to put it on your dog, it swivels allowing the chain to twist because of gravity. For a constricting loop chain, the weight of the chain makes the connector swivel so that chains lie next to each other, not one on top of the other, and twisting of the constricting loop chain results. This twisting impedes movement of the constricting loop chain so that difficulties in tightening the collar result. Moreover, the chain can twist more as it is put on the dog if the swivel is nudged by the dogs neck.

The means for reversibly connecting of the instant invention has a reversible fastener for attaching to the other of the first end and the second end of the primary collar section independent of twisting when attached to the neck of the domestic animal. This is provided by having the means for reversibly connecting being independent of internal rotation about its longitudinal axis.

Alternative technology is available in the form of U.S. Pat. No. 5,647,303 issued in 1997 to Deioma for a constrictive collar which teaches a pinch collar having a swiveling bolt fastener slidably attached to a constrictive loop or chain; U.S. Pat. No. 4,964,369 issued in 1990 to Sporn for a strain reducing dog harness having a collar and a pair of restraint cables removably attachable to the collar via snap connectors; and U.S. Pat. No. 4,924,815 issued to Halla in 1990 for a collar disclosing a constricting animal collar having a chain slidably attached between a pair of attachment rings that are secured to the ends of the collar. Other choke collars include U.S. Pat. Nos. 3,159,140 and 4,996,648, issued in 1963 and 1991 respectively, for constricting animal collars used for training.

The principal disadvantage of such devices are the predisposition to tangling and twisting of the constricting loop. The swivel on the clip that closes the collar allows the chain to twist making the handler's constricting correction action impaired.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

To alleviate this problem, and others which will become apparent from the disclosure which follows, the guidance device of the instant invention effectively eliminates twisting.

If the owner/trainer is aware of the proper way to fit a prong collar with the collar tight around the dog's neck, the following scenario may occur with the disadvantageous twist of the swivel connector. The swivel allows the chain to twist on its own, without the handler realizing it. It is very difficult to put this collar on the dog untwisted because the swivel is constantly moving with the weight of the chain. When putting it on the dog, the dog's neck may push the swivel connector one of two ways with one being to twist the chain further. If that happens, not only is the constricting action compromised, but the swivel connector may entangle the dog's fur, even pulling some out, when the handler attempts a correction.

If the owner/trainer improperly uses the prong collar by allowing it to be loose on the dog's neck, the swivel on the connecting bolt may correct some twist that occurs when putting this collar on the dog. Depending on how many times the chain is twisted, it may or may not correct the situation. However, a knowledgeable professional trainer or owner would never allow the collar fitted this way. As a result, a swivel connector is only effective, if at all, only when the collar is fitted improperly. The swivel connector causes twisting and only if the collar is fitted wrong can it help correct the twisting.

This situation is remedied by the guidance device of this important invention. The aperture on the non-swiveling connector acts as part of the collar—making the collar a non-twisting element where the only way to twist the chain is to twist the collar and no owner or trainer regardless of experience level would do that. The guidance device of the instant invention cannot twist on its own without the owner/trainer realizing it. For the educated or the unknowledgeable user this invention works. The majority of people who purchase prong collars are either educated dog owners or are working with knowledgeable trainers who will help them fit the collar properly. The prior art collars with swivel connectors are of little use to them, as they create problems with the chain becoming twisted. The instant collar solves this problem.

An additional advantage of the guidance device is that a non-rotating connector can be disposed so that its latch is disposed outwardly relative to the neck of the dog. The advantage of this feature is that the latch is easily accessible to the dog handler and will not easily become disengaged by contact with the pet. This will avoid the latch being accidentally opened because it pressed into the dog's skin and unlatched.

Still other advantages will be apparent from the disclosure that follows.

SUMMARY OF THE INVENTION

The invention relates to a guidance device for a domestic animal comprising a primary collar section having a first end and a second end, a secondary collar section connected to one of the first end and the second end of the primary collar section, and means for reversibly connecting the secondary collar section and the other of the first end and the second end of the primary collar section. The means for reversibly connecting has a reversible fastener for attaching to the other of the first end and the second end of the primary collar section when attached to the neck of the domestic animal independent of twisting of the secondary collar section. This is provided by having a means which is independent of internal rotation about its longitudinal axis.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein.

DETAILED DESCRIPTION OF THE INVENTION

Figure 1:
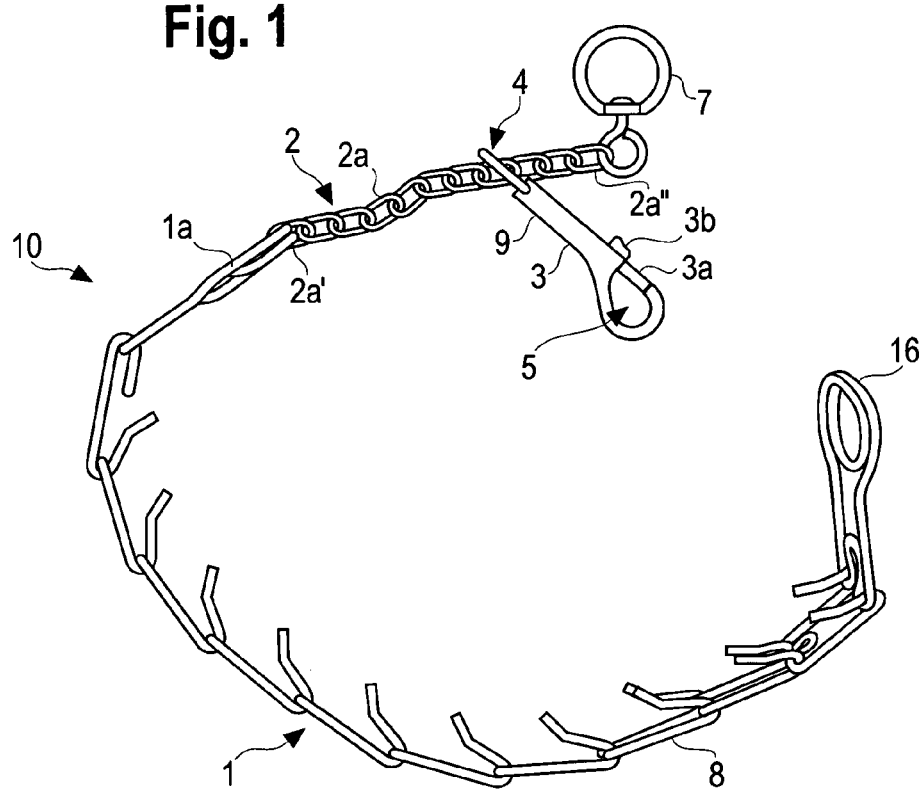
FIG. 1 is a perspective view of the guidance device of the present invention showing a means for reversibly connecting that is independent of the internal rotation.

The preferred embodiments of the apparatus depicted in the drawing comprise a guidance device 10 for a domestic animal comprising a primary collar section 1 having a first end 1a and a second end 1b, a secondary collar section 2 connected to one of the first end 1a and the second end 1b of the primary collar section, and means for reversibly connecting 3 the secondary collar section 2 and the other of the first end 1a and the second end 1b of the primary collar section 1. The means for reversibly connecting having a longitudinal axis and being independent of internal rotation about the longitudinal axis, and the means for reversibly connecting having a reversible fastener 3a for attaching to the other of the first end and the second end of the primary collar section 1. The guidance device 10 can be attached to the neck of the domestic animal independent of twisting of the secondary collar section 2.

Preferably, the means for reversibly connecting 3 has an aperture 4 and an opening 5 with the opening being associated with the reversible fastener 3a, and with the aperture 4 lying generally in a first plane and the opening 5 lying generally in a non-parallel second plane. As shown best in FIG. 1, a line normal to the first plane would be perpendicular to a line normal to the second plane.

Figure 2:
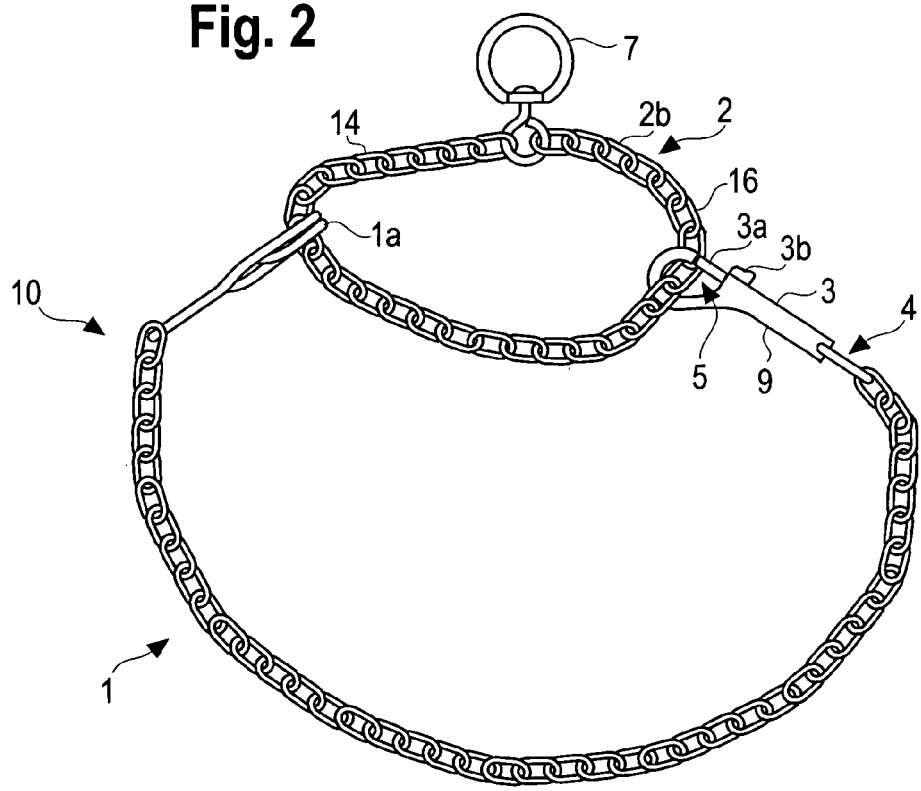
FIG. 2 is a perspective view of the guidance device of the instant invention with a constricting loop.
Figure 3:
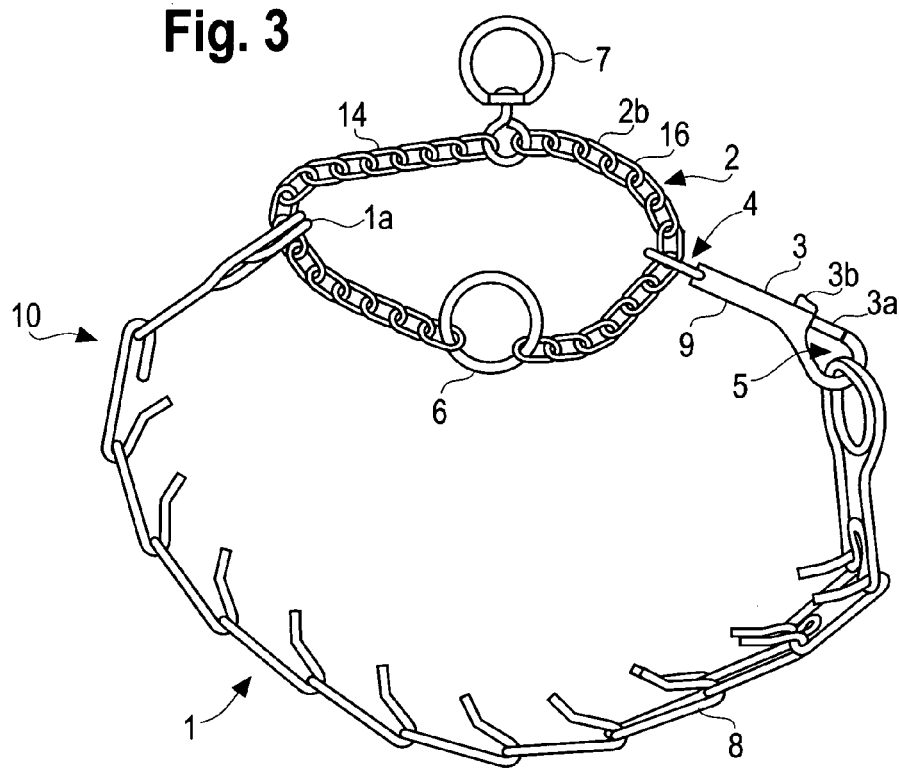
FIG. 3 is a perspective view of the guidance device of the instant invention showing a primary collar section comprising a plurality of prong links.
Figure 4:
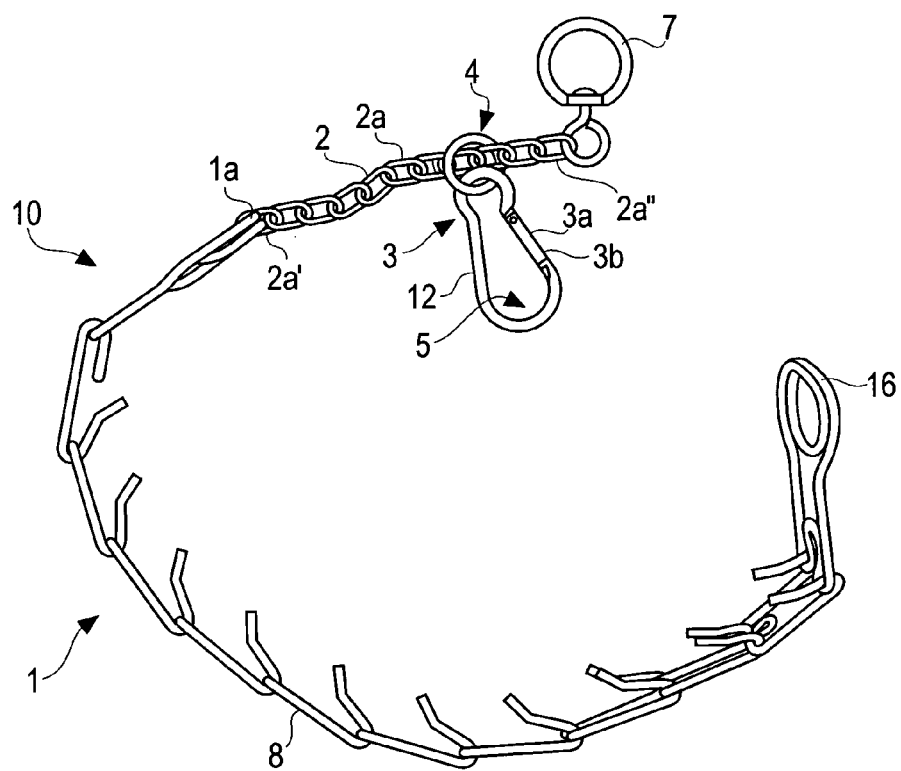
FIG. 4 is a perspective view of the guidance device of the instant invention showing a clasp and retaining ring for the means for reversibly connecting.
Figure 5:
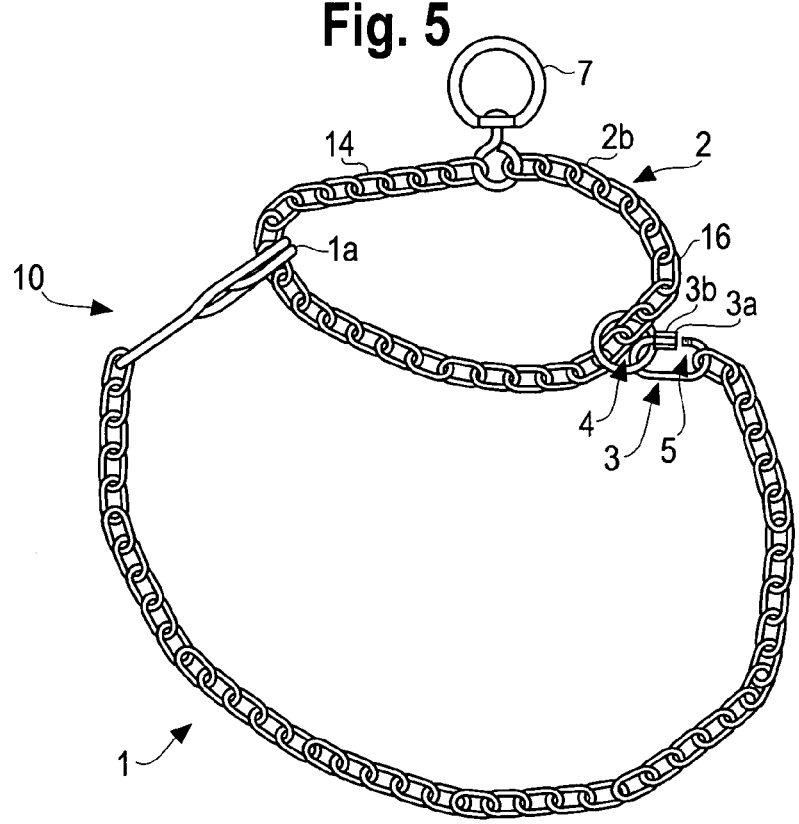
FIG. 5 is a perspective view of the guidance device of the instant invention showing a closeable ring and retaining ring for the means for reversibly connecting.
Figure 6:
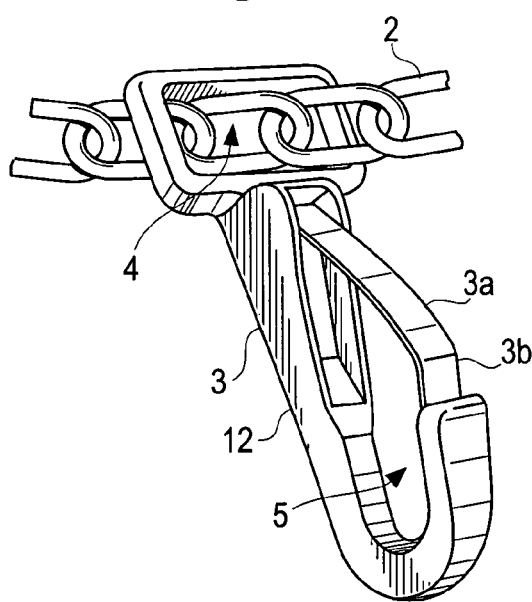
FIG. 6 is an enlarged view of a non-swiveling connector for the means for reversibly connecting of the guidance device of the instant invention.
Figure 7:
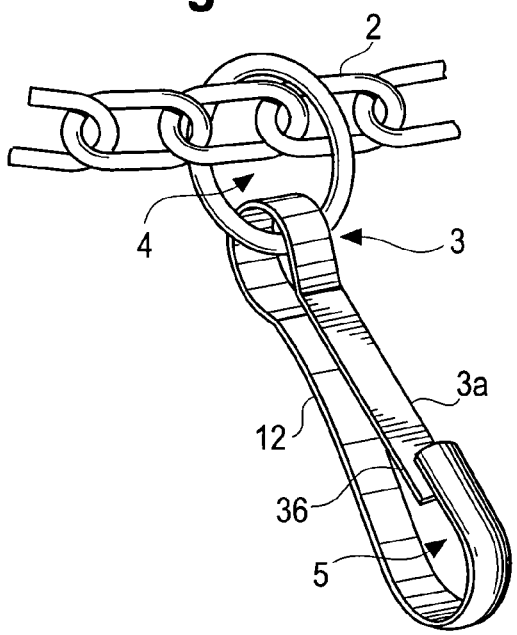
FIG. 7 is an enlarged view of a retaining ring and another non-swiveling connector for the means for reversibly connecting of the guidance device of the instant invention.

As shown in FIGS. 1–7, the means for reversibly connecting 3 is slidably engaged to the secondary collar section 2. Another preferred aspect of the guidance device 10 includes the secondary collar section 2 having a restrictor 6 of suitable size to prevent the means for reversibly connecting 3 from sliding along the entire length of the secondary collar section 2 so that the domestic animal can not be choked by the guidance device, as shown in FIG. 3.

The reversible fastener 3a of the means for reversibly connecting 3 has a latch 3b that is best disposed outwardly relative to the neck of the domestic animal. The advantage of this feature is that the latch 3b is easily accessible to the dog handler and will not easily become disengaged by contact with the handler's pet.

The guidance device for a domestic animal can employ numerous secondary collar sections 2 including a flexible chain 2a and a closed constricting loop 2b. The chain 2a may have a first end 2a' connected to one of the first end 1a and the second end 1b of the primary collar section 1, and a second end 2a" with a lead connector 7. The means for reversibly connecting 3 can be slidable along the length of the chain 2a to form a choke collar as shown in the drawing. Preferably, the lead connector 7 is rotatable.

The guidance device 10 for a domestic animal may include a primary collar section 1 having a first end 1a and a second end 1b, a secondary collar section 2 connected to one of the first end 1a and the second end 1b of the primary collar section 1, and means for reversibly connecting 3 the secondary collar section 2 and the other of the first end 1a and the second end 1b of the primary collar section. The means for reversibly connecting 3 is slidably engaged to the secondary collar section 2 and has a longitudinal axis and being independent of internal rotation about the longitudinal axis. The means for reversibly connecting 3 has a reversible fastener 3a for attaching to one of the secondary collar section 2 and the other of the first end 1a and the second end 1b of the primary collar section. The reversible fastener 3a of the means for reversibly connecting has a latch disposed outwardly relative to the neck of the domestic animal, so that the guidance device can be attached to the neck of the domestic animal independent of twisting of the secondary collar section.

The means for reversibly connecting 3 of the guidance device 10 for a domestic animal may have an aperture 4 and an opening 5 with the opening being associated with the reversible fastener 3a. The aperture 4 lies generally in a first plane and the opening 5 lies generally in a non-parallel second plane. Preferably, a line normal to the first plane is perpendicular to a line normal to the second plane. Additionally, the secondary collar section 2 may comprise a chain 2a having a first end 2a' connected to one of the first end 1a and the second end 1b of the primary collar section 1, a second end 2a" with a rotatable lead connector 7; the secondary collar section 2 may comprise a restrictor 6 of suitable size to prevent the means for reversibly connecting 3 from sliding so far along the secondary collar section 2 that the domestic animal can be choked by the guidance device.

Other features of the guidance device for a domestic animal include the primary collar section 1 having a plurality of prong links 8 operably connected to form a flexible chain; the means for reversibly connecting 3 comprising a non-swiveling snap fastener 9; or the means for reversibly connecting 3 may comprise a spring biased clip 12. Furthermore, the secondary collar section 2 may comprise a constricting loop 2b having a lead connector 7, a first segment 14 and a second segment 16. The first segment 14 may extend from one side of the lead connector 7, and the second segment 16 may extend from the other side of the lead connector 7 and connect with the first segment to form the constricting loop 2b. The first segment 14 may be slidably connected to one of the first end 1a and the second end 1b of the primary collar section 1 and the second segment 16 may be slidably connected to the means for reversibly connecting 3, so that the means for reversibly connecting can be fastened slidably to one of the second segment 16 and the other of the first end 1*a* and the second end 1*b* of the primary collar section 1 to close the guidance device about the neck of the domestic animal, as shown in FIGS. 3 and 2, respectively.

Preferably, the guidance device 10 for a domestic animal comprises a primary collar section 1 having a first end 1*a* and a second end 1*b;* a secondary collar section 2 connected to one of the first end and the second end of the primary collar section. The secondary collar section may comprises a constricting loop 2*b* having a lead connector 7, a first segment 14 and a second segment 16. The first segment 14 preferably extends from one side of the lead connector 7, and the second segment 16 extends from the other side of the lead connector 7 and connects with the first segment 14 to form the constricting loop 2*b*. The first segment 14 may be slidably connected to one of the first end 1*a* and the second end 1*b* of the primary collar section 1. The second segment 16 may also be slidably connected to the means for reversibly connecting 3. Means for reversibly connecting 3 the secondary collar section 2 and the other of the first end 1*a* and the second end 1*b* of the primary collar section are also provided. The means for reversibly connecting 3 has a longitudinal axis and is independent of internal rotation about the longitudinal axis. The means for reversibly connecting may have a reversible fastener 3*a* for attaching to one of the second segment 16 and the other of the first end 1*a* and the second end 1*b* of the primary collar section. The reversible fastener 3*a* of the means for reversibly connecting may have a latch 3*b* disposed outwardly relative to the neck of the domestic animal. Thus, the guidance device 10 can be attached to the neck of the domestic animal independent of twisting, and the means for reversibly connecting 3 can be fastened to one of the second segment 16 and the other of the first end 1*a* and the second end 1*b* of the primary collar section 1 to close the guidance device about the neck of the domestic animal.

Moreover, the means for reversibly connecting 3 may have an aperture 4 and an opening 5 with the opening being associated with the reversible fastener 3*a*. The aperture 4 preferably lies generally in a first plane and the opening 5 preferably lies generally in a non-parallel second plane. Another preferred teaching includes a line normal to the first plane being perpendicular to a line normal to the second plane.

Other preferred aspects include the primary collar section 1 having a plurality of prong links 8 operably connected to form a flexible chain; the means for reversibly connecting 3 having a non-swiveling snap fastener 9; and the means for reversibly connecting 3 comprising a spring biased clip 12.

The guidance device of the instant invention may be of any preferred form and construction, but which, as shown in the present instance, comprises generally available off the shelf components made of metal, preferably stainless steel. It will readily be appreciated by those skilled in the art that the device may be constructed of any material suited to the purpose, such as metal, plastic, leather, strap material, or the like.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A guidance device for a domestic animal comprising:
  a. a primary collar section having a first end and a second end;
  b. a secondary collar section connected to one of the first end and the second end of the primary collar section; and
  c. a reversible fastener being attached at a first end to a first connection, being one of the secondary collar section and the other of the first end and the second end of the primary collar section,
    said reversible fastener having a moveable latch for reversibly attaching to complete a connection between the secondary collar section and the other of the first end and the second end of the primary collar section and further having a longitudinal axis and being independent of internal rotation about said longitudinal axis,
    whereby, the guidance device can be attached to the neck of the domestic animal independent of twisting of the secondary collar section.

2. The guidance device for a domestic animal of claim 1, wherein the recersible fastener has an aperture and an opening with said opening being associated with the reversible fastener,
  said aperture lying generally in a first plane and said opening lying generally in a non-parallel second plane.

3. The guidance device for a domestic animal of claim 2, wherein a line normal to the first plane is perpendicular to a line normal to the second plane.

4. The guidance device for a domestic animal of claim 1, wherein the recersible fastener is slidably engaged to the secondary collar section.

5. The guidance device for a domestic animal of claim 4, wherein the secondary collar section comprises a restrictor of suitable size to prevent the recersible fastener from sliding along the entire length of the secondary collar section so that the domestic animal can not be choked by the guidance device.

6. The guidance device for a domestic animal of claim 1, wherein the secondary collar section comprises a chain having a first end connected to one of the first end and the second end of the primary collar section, and a second end with a lead connector,
said recersible fastener being slidable along the length of the chain to form a choke collar.

7. The guidance device for a domestic animal of claim 6, wherein the lead connector is rotatable.

8. The guidance device for a domestic animal of claim 1, wherein the primary collar section comprises a plurality of prong links operably connected to form a flexible chain.

9. The guidance device for a domestic animal of claim 1, wherein the a recersible fastener comprises a non-swiveling snap fastener.

10. The guidance device for a domestic animal of claim 1, wherein the a recersible fastener comprises a spring biased clip.

11. The guidance device for a domestic animal of claim 1, wherein the secondary collar section comprises a constricting loop having a lead connector, a first segment and a second segment,
said first segment extends from one side of the lead connector, and said second segment extends from the other side of the lead connector and connects with the first segment to form the constricting loop,
said first segment is slidably connected to one of the first end and the second end of the primary collar section,
said second segment is slidably connected to the recersible fastener
whereby, the means for reversibly connecting can fastened slidably to one of the second segment and the other of the first end and the second end of the primary collar section to close the guidance device about the neck of the domestic animal.

12. An guidance device for a domestic animal comprising:
a. a primary collar section having a first end and a second end;
b. a secondary collar section connected to one of the first end and the second end of the primary collar section; and
c. means for reversibly connecting the secondary collar section and an other of the first end and the second end of the primary collar section,
said means for reversibly connecting having a longitudinal axis and being independent of internal rotation about said longitudinal axis, and
said means for reversibly connecting having a reversible fastener for attaching to one of the secondary collar section and the other of the first end and the second end of the primary collar section and having a latch disposed outwardly relative to the neck of the domestic animal,
whereby, the guidance device can be attached to the neck of the domestic animal independent of twisting of the secondary collar section.

13. A guidance device for a domestic animal comprising:
a. a primary collar section having a first end and a second end;
b. a secondary collar section connected to one of the first end and the second end of the primary collar section;
c. means for reversibly connecting the secondary collar section and an other of the first end and the second end of the primary collar section,
said means for reversibly connecting having a longitudinal axis and being independent of internal rotation about said longitudinal axis, and
said means for reversibly connecting being slidably engaged to the secondary section;
said means for reversibly connecting having a reversible fastener for attaching to one of the secondary collar section and the other of the first end and the second end of the primary collar section,
said reversible fastener of the means for reversibly connecting having a latch disposed outwardly relative to the neck of the domestic animal,
whereby, the guidance device can be attached to the neck of the domestic animal independent of twisting of the secondary collar section.

14. The guidance device for a domestic animal of claim 13, wherein the means for reversibly connecting has an aperture and an opening with said opening being associated with the reversible fastener,
said aperture lying generally in a first plane and said opening lying generally in a non-parallel second plane.

15. The guidance device for a domestic animal of claim 14, wherein a line normal to the first plane is perpendicular to a line normal to the second plane.

16. The guidance device for a domestic animal of claim 14, wherein the secondary collar section comprises a chain having a first end connected to one of the first end and the second end of the primary collar section, a second end with a rotatable lead connector, and the secondary collar section comprises a restrictor of suitable size to prevent the means for reversibly connecting from sliding so far along the secondary collar section that the domestic animal can be choked by the guidance device.

17. A guidance device for a domestic animal comprising:
a. a primary collar section having a first end and a second end;
b. a secondary collar section connected to one of the first end and the second end of the primary collar section,
said secondary collar section comprising a constricting loop having a lead connector, a first segment and a second segment,
said first segment extends from one side of the lead connector, and said second segment extends from an other side of the lead connector and connects with the first segment to form the constricting loop,
said first segment is slidably connected to one of the first end and the second end of the primary collar section; and
c. means for reversibly connecting the secondary collar section and an other of the first end and the second end of the primary collar section,
said second segment is slidably connected to the means for reversibly connecting,
said means for reversibly connecting having a longitudinal axis and being independent of internal rotation about said longitudinal axis,
said means for reversibly connecting having a reversible fastener for attaching to one of the second segment and the other of the first end and the second end of the primary collar section,
said reversible fastener of the means for reversibly connecting having a latch disposed outwardly relative to the neck of the domestic animal,
whereby, the guidance device can be attached to the neck of the domestic animal independent of twisting, and the means for reversibly connecting can be fastened to one of the second segment and the other of the first end and the second end of the primary collar section to close the guidance device about the neck of the domestic animal.

18. The guidance device for a domestic animal of claim 17, wherein the means for reversibly connecting has an aperture and an opening with said opening being associated with the reversible fastener, said aperture lying generally in a first plane and said opening lying generally in a non-parallel second plane.

19. The guidance device for a domestic animal of claim 18, wherein a line normal to the first plane is perpendicular to a line normal to the second plane.

20. The guidance device for a domestic animal of claim 17, wherein the primary collar section comprises a plurality of prong links operably connected to form a flexible chain.

21. The guidance device for a domestic animal of claim 17, wherein the means for reversibly connecting comprises a non-swiveling snap fastener.

22. The guidance device for a domestic animal of claim 17, wherein the means for reversibly connecting comprises a spring biased clip.

* * * * *

UNITED STATES PATENT AND TRADEMARK OFFICE
CERTIFICATE OF CORRECTION

PATENT NO.        : 7,051,682 B2
APPLICATION NO.   : 10/648501
DATED             : May 30, 2006
INVENTOR(S)       : Irene Clute and Christine Gajda Page 1 of 1

It is certified that error appears in the above-identified patent and that said Letters Patent is hereby corrected as shown below:

Col. 6, Claim 2, line 53, replace the word "recersible" with "reversible";

Col. 6, Claim 4, line 63, replace the word "recersible" with "reversible";

Col. 6, Claim 5, line 67, replace the word "recersible" with "reversible";

Col. 7, Claim 6, line 9, replace the word "recersible" with "reversible";

Col. 7, Claim 9, line 17, replace the word "recersible" with "reversible";

Col. 7, Claim 10, line 20, replace the word "recersible" with "reversible";

Col. 7, Claim 11, starting on line 32 and continuing on line 33, replace the word "recersible" with "reversible";

Signed and Sealed this

Fifth Day of September, 2006

JON W. DUDAS
*Director of the United States Patent and Trademark Office*